United States Patent
Everett et al.

(10) Patent No.: US 7,314,122 B2
(45) Date of Patent: Jan. 1, 2008

(54) BICYCLE BRAKE ASSEMBLY HAVING MULTIPLE REPLACEABLE BRAKE PADS

(76) Inventors: Richard C. Everett, 225 Sunshine La., West Lynn, OR (US) 97068; Randall Scott Smith, 14151 S. Livesay Rd., Oregon City, OR (US) 97045

( * ) Notice: Subject to any disclaimer, the term of this patent is extended or adjusted under 35 U.S.C. 154(b) by 0 days.

(21) Appl. No.: 10/632,980

(22) Filed: Aug. 4, 2003

(65) Prior Publication Data

US 2005/0029058 A1     Feb. 10, 2005

(51) Int. Cl.
*B62L 3/00* (2006.01)

(52) U.S. Cl. ............ 188/24.22; 188/238; 188/244

(58) Field of Classification Search .. 168/24.12–24.22, 168/73.1, 238, 239, 240, 244, 245, 251 A, 168/251 R, 242
See application file for complete search history.

(56) References Cited

U.S. PATENT DOCUMENTS

| | | | | |
|---|---|---|---|---|
| 471,891 | A * | 3/1892 | Penney | 188/240 |
| 793,747 | A * | 7/1905 | Smith | 188/240 |
| 3,868,002 | A * | 2/1975 | Babled | 188/73.1 |
| 4,231,451 | A * | 11/1980 | Fujii | 188/73.1 |
| 5,555,959 | A * | 9/1996 | Everett | 188/73.1 |
| 6,125,973 | A * | 10/2000 | Irvine | 188/24.22 |
| 6,786,308 | B1 * | 9/2004 | Huang | 188/24.12 |
| 6,892,863 | B2 * | 5/2005 | Everett | 188/238 |

* cited by examiner

*Primary Examiner*—Chris Schwartz
(74) *Attorney, Agent, or Firm*—Edward E. Roberts

(57) ABSTRACT

A bicycle brake shoe assembly including multiple brake pads of different braking compounds replaceably inserted sequentially into a truncated pad holder. The pads have an overlap at one end and an under-lap at the other end such that upon assembly within the holder an overlap portion is mated over an under-lap portion. The pads are captured and retained in place in the truncated holder by a removable end cap. The overlap/under-lap pad mating cooperates with the pad holder and end cap to prevent pad pull out because of wheel rim movement forces on the pads. The brake shoe assembly has a transverse curvature substantially in conformance with the radius of curvature of the bicycle wheel rim, thereby improving pad contact with the wheel rim.

17 Claims, 5 Drawing Sheets

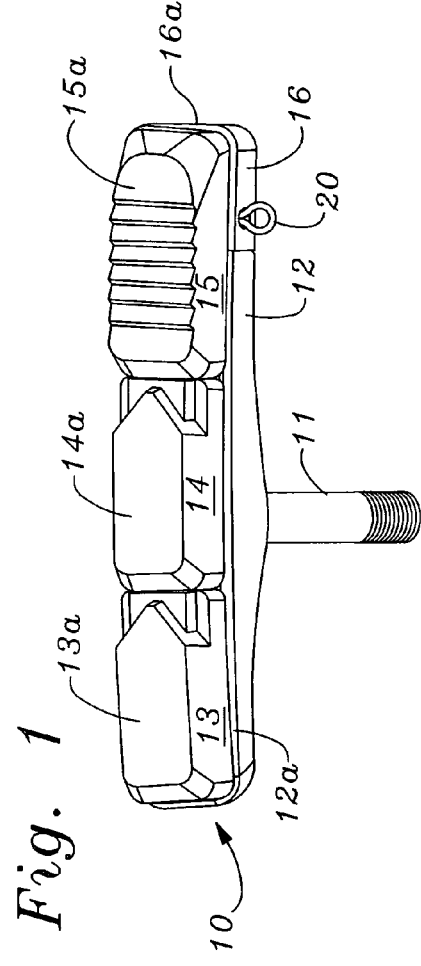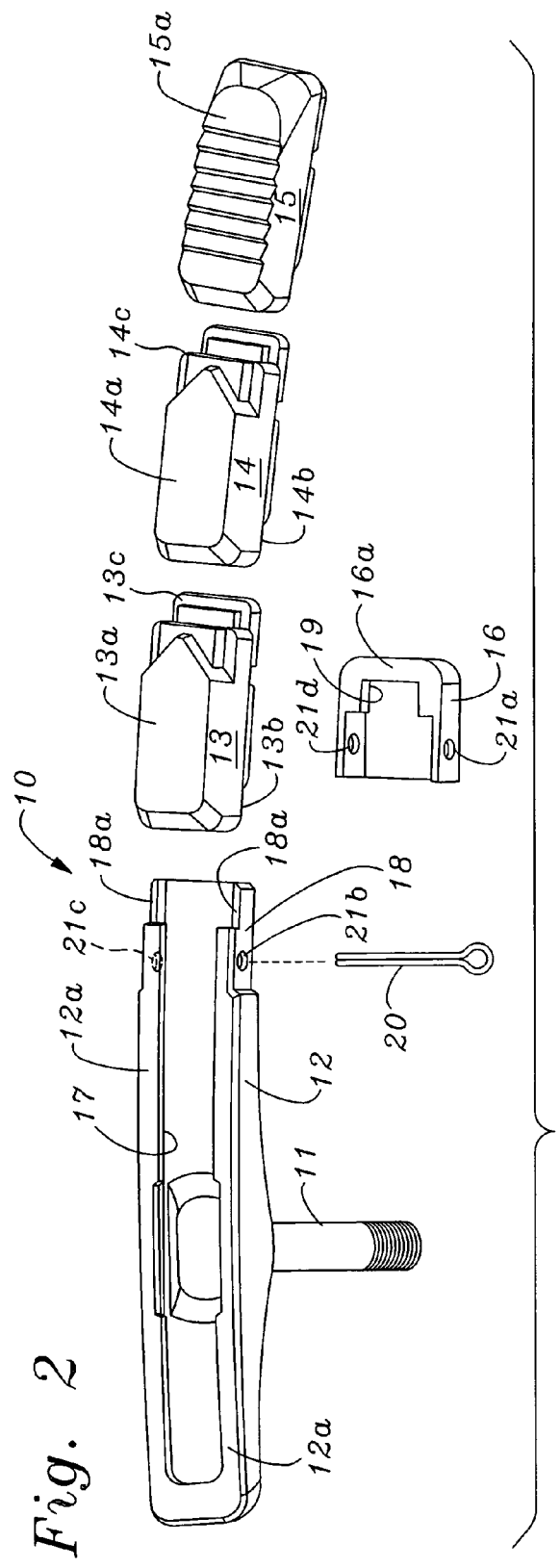

BICYCLE BRAKE ASSEMBLY HAVING MULTIPLE REPLACEABLE BRAKE PADS

CROSS-REFERENCE TO RELATED APPLICATIONS

This application was with U.S. application Ser. No. 10/075,580 which matured on 17 May 2005 into U.S. Pat. No. 6,892,863.

BACKGROUND

The background of the invention will be discussed in two parts:

1. Field of the Invention

This invention relates to bicycle brake assemblies, and more particularly to an assembly having a brake pad holder with interchangeably brake pads of different braking characteristics, the holder and brake pads having configurations resisting pad compression and pop-out due to wheel rim movement pressure on the pads.

2. Description of the Related Art

Bicycles commonly have braking assemblies that grip the bicycle wheel rim in response to operator manipulation of brake levers. Such brake assemblies are generally mounted to the bicycle frame and include brake shoes that are movably mounted on caliper assemblies that bridge the rim. The brake shoes have a brake pad of friction material for abutting and frictionally engaging the rim for slowing or stopping of the bicycle. The majority of such brake pads are of a single material composition and have some form of design in the engaging surface, similar to the tread design of tires, to promote friction for a particular breaking condition, or for braking in general to stop the bicycle. In some prior art brake pads the composition is of such a friction material that cause the pads to squeal or chatter upon application, and in virtually all instances provide uneven wear of the brake pads at the point of engagement resulting in uneven application of force to the rim. Brake shoes having such pads have been generally rectangular in configuration with the fastening stud at the mid-point thereof.

U.S. Pat. No. 5,555,958 issued to Richard C. Everett on 17 Sep. 1996, and U.S. Pat. No. 5,896,955 issued to Richard C. Everett on 27 Apr. 1999, show and describe bicycle brake pads having a partitioned unitary pad with at least two pads formed of dissimilar material, with the pad partitions configured for simultaneous engagement with the bicycle rim. Such brake pads are formed of different combinations of multi-rubber of elastomers instead of a single material composition to thus improve braking characteristics, such as wet or dry braking and/or to stop squealing and grabbing, with the same pad.

U.S. Pat. No. 6,244,396 issued to Lumpkin on 12 Jun. 2001 discloses an elongate brake pad holder having a plurality of removable pad segments axially positioned in the holder. A stay maintains the pads in a fixed position within the holder. No provision is made therein to provide restriction of pad compression and pad pull out, and thus pad stability, due to the wheel rim movement pressure on the pads.

Such devices are illustrative of the many and varied arrangements whereby attempts have been made to improve the braking of bicycles. However, the related art brake pads, and even brake assemblies, remain limited in braking characteristic variation and flexibility. For the foregoing reasons there is a need for a brake pad assembly having replaceable pads with dissimilar braking characteristics providing for braking variation and flexibility under different riding conditions with adequate provision for pad stability in the pad holder.

It is thus an aspect of the present invention to provide a new and improved bicycle braking assembly having interchangeable brake pads providing for braking variation and flexibility under different riding conditions.

It is another aspect of the invention to provide an improved bicycle brake assembly having a re-useable brake shoe, or holder, for receiving brake pads composed of different braking compounds that can be interchanged and rearranged within the shoe to provide variation in braking characteristics of the assembly.

It is also an aspect of the present invention to provide an bicycle brake assembly having replaceable pads of different braking compounds with adjacent pads having alternate overlapping and under-lapping ends such that when assembled within the holder an overlapping end is mated over an under-lapping end to deter pull out of the pads due to wheel rim movement pressure.

It is a further aspect of the invention to provide a unique bicycle brake holder having replaceable brake pads with dissimilar braking characteristics including a removable end cap providing increased resistance to pad compression, bulging, and pull out due to wheel rim pressure on the pads.

Other aspects, features and advantages of the invention will become apparent from a reading of the specification, when taken in conjunction with the drawings, in which like reference numerals refer to like elements in the several views.

SUMMARY

The present invention is directed to a bicycle brake shoe assembly that satisfies the need for a brake pad assembly with replaceable pads of different compounds having different braking characteristics providing for braking variation and flexibility under different riding conditions with adequate provision for pad stability in the pad holder. The assembly includes a plurality of replaceable pads inserted sequentially into an elongated truncated pad holder, the pads formed of different braking compounds to provide different braking characteristics to the bicycle. The pads may be replaced and/or rearranged within the holder. They are captured and retained in place by locking means such as an end cap configured for mating engagement with the truncated holder. The brake pads are configured to coordinate with the pad holder and locking means to provide for increased resistance to pad compression, bulging, and/or brake pad pull out of the holder due to wheel rim movement pressure on the pads. The brake pads have an overlap at one end and an under-lap at the other end such that upon assembly in the holder the overlap portion of a pad is mated over the under-lap portion of the adjacent pad. The assembly design characteristics provide pad pop-out resistance to pressure from wheel rim movement. The brake pad holder has a longitudinal curvature that is substantially in conformance with the radius of curvature of the bicycle wheel rim, thereby improving pad contact with the wheel rim.

DRAWINGS

FIG. 1 is a perspective view of a brake shoe assembly having brake pads of different configuration and braking compounds embodying features of the present invention;

FIG. 2 is an exploded perspective view of a brake shoe assembly of FIG. 1;

DESCRIPTION

Figure 3:
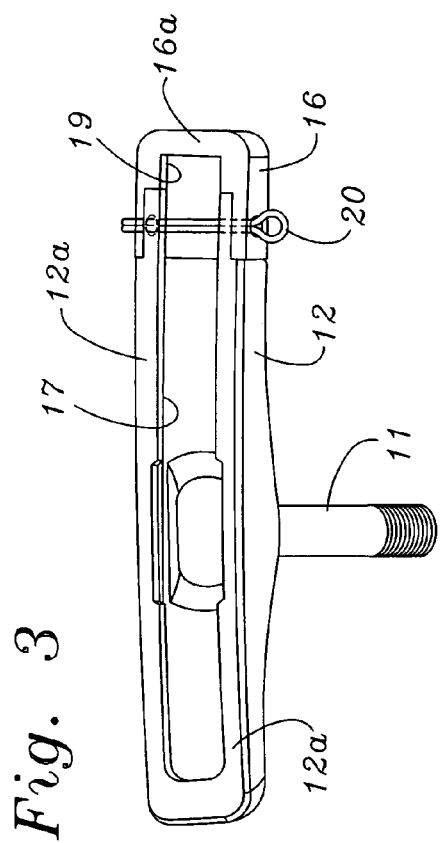
FIG. 3 is a perspective view of the brake shoe holder of FIG. 1 without the brake pads assembled in the holder.

Referring now to the drawings, and particularly to FIGS. 1 and 2, there is shown brake shoe assembly, generally designated 10, embodying features of the invention. The assembly 10 includes a fastening means, such as a threaded stud member 11, secured to a brake pad support member, such as the backbone, or brake pad holder 12. Holder 12 is truncated with an open end configured to matingly accept complementary closure means such as end cap 16, thus allowing for insertion into holder 12 of brake pads 13-15 which are then captured in place by end cap 16 and secured by locking pin 20. End cap 16 and locking pin 20 not only serve to capture and secure pads 13-15 within holder 16, but, as will be further explained below, are designed and positioned, in cooperation with brake pad design, to prevent brake pad pop-out due to wheel rim movement pressure on the pads. Holder 12 can be of forged and machined aluminum whereas end cap 16 can be die cast aluminum. Other materials and methods of manufacture could be used without departing from the spirit and scope of the invention.

Figure 6:
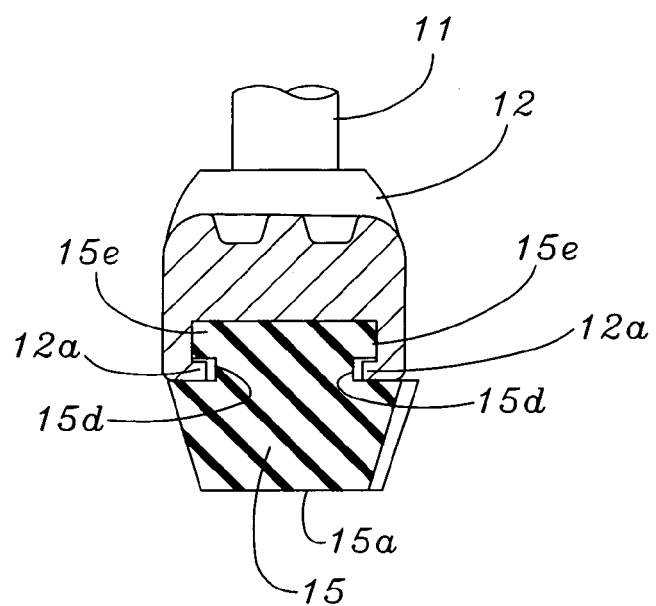
FIG. 6 is a cross-sectional view of the brake shoe assembly of FIG. 5 along the line 6-6 of FIG. 5.

FIG. 2 illustrates in exploded view the brake shoe assembly 10 of FIG. 1. After the brake pads 13-15 are sequentially inserted into holder 12 as will hereinafter be explained, end cap 16 is mated to holder 12 as variously shown in the figures. As shown in FIGS. 2, 3 and 6, holder 12 has a protrusion 12a defined by an undercut groove 17 that extends around the perimeter of the holder 12 except for the truncated open end thereof. Likewise, end cap 16 has a protrusion 16a defined by undercut groove 19, and is designed for mating with the truncated open end of holder 12. As best shown in FIG. 2, the truncated end of holder 12 is formed with a first side 18 recessed inwardly in cutout manner in the holder 12. Although not shown, the other side of the truncated end is formed with an identical inwardly recessed side 18. This provides that the outside dimension of holder 12, at the recessed sides 18, is less than the inside dimensions of groove 19 of end cap 16. Thus, when end cap 16 is mated to holder 12, groove 19 slides around the inwardly recessed sides 18 whereby, as shown in FIG. 3, the outside dimensions of holder 12 become the same as the outside dimensions of end cap 16.

Further, recessed sides 18 have step cuts 18a, and protrusions 12a and 16a have cut away portions above holes 21b, 21c and 21a, 21d, respectively. Thus, in mating of end cap 16 to holder 12, protrusion 16a overlaps step cuts 18 and cut away portions of protrusions 16a and 12a mate together. Likewise, the inwardly cut-away portions of protrusion 12a and the outwardly cut-way portions of protrusion 16a mate flush and even. Mated in this complementary manner, as shown in FIG. 3, protrusions 16a and 12a provide a continuous aligned protrusion, and associated undercut, completely around the perimeter of the combination of holder 12 and end cap 16. This continuous protrusion and associated undercut groove of holder 12 and end cap 16 provides for brake pads 13-15 to be captured and aligned as will be hereinafter explained. The recessed sides 18 have holes 21b and 21c and end cap 16 has holes 21a and 21d that match up when end cap 16 mates with holder 12 such that pin 20 can be inserted therethrough to secure end cap 16 to holder 12. Thus, locking pin 20 is inserted, in sequence, into end cap 16 aperture 21a, through matching aperture 21b in holder 12, through brake pad recess 22 (see FIG. 4) and then ultimately through apertures 21c and 21d of holder 12 and end cap 16 respectively.

Figure 4:
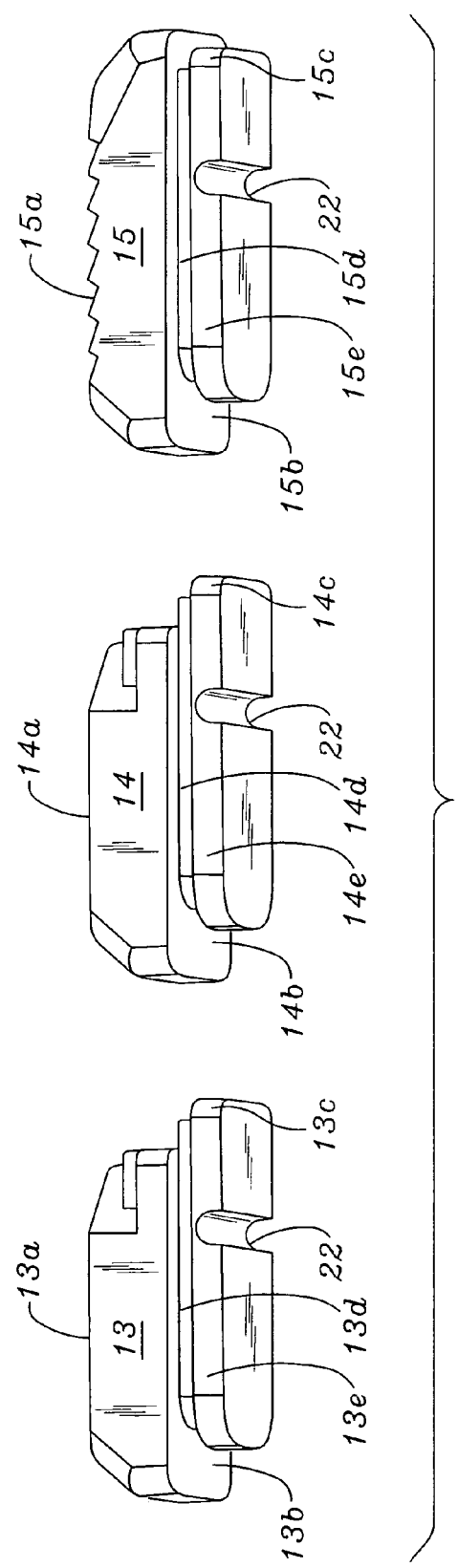
FIG. 4 is a perspective view showing the configuration of the brake pads embodying features of the present invention.
Figure 5:
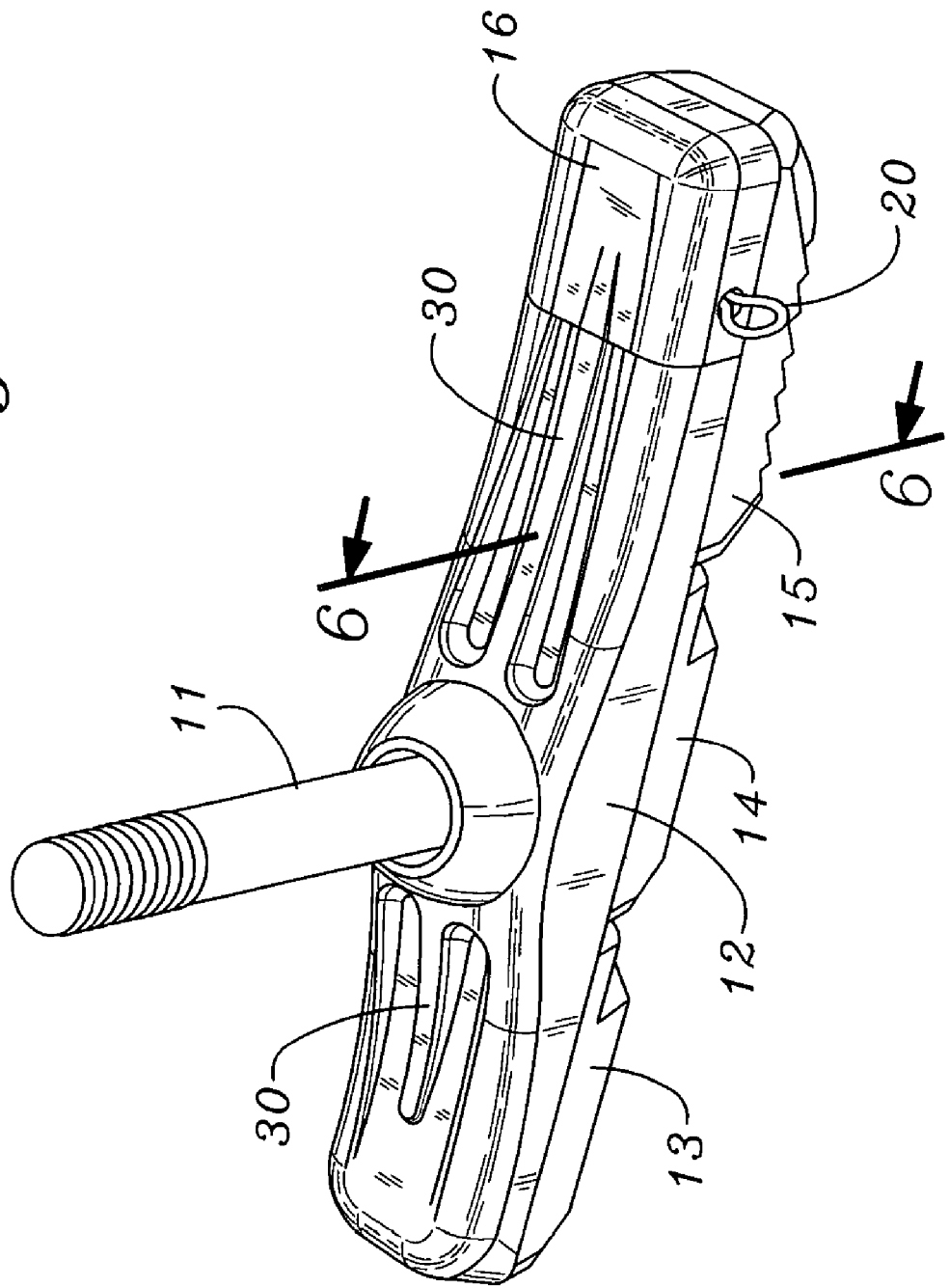
FIG. 5 is a top perspective view of the brake shoe assembly of FIG. 1.

In FIGS. 2, 4 and 6, the brake pads 13-15 are described embodying features of the invention, FIG. 6 being a cross-sectional view taken along the lines 6-6 of FIG. 5. Pads 13 and 14 have braking portion surfaces 13a, 14a, and substantially identical overlap ends 13b, 14b, under-lap ends 13c, 14c, and undercut indentations 13d, 14d that define pad bottom protrusions 13e, 14e, respectively. Brake pad 15 is shown configured as a special pad such as a wiper pad, and as such has surface 15a, overlap 15b, undercut indentation 15d defining pad bottom protrusion 15e, and a shortened protrusion 15c mating with end cap protrusion 16a. Since protrusion 15c is not mated to another pad, it can be as shown, but need not be, of a different configuration. To properly perform its function as a wiper pad, pad 15 would be the last pad inserted and thus the lead pad as the rim turns into the brake assembly. Otherwise, the pads could be inserted in any order desired and pad 15 could be of the same configuration as pads 13 and 14. In this case protrusion 15c, indentation 15d and bottom protrusion 15e would have the same configuration as that of pads 13 and 14 and it would still mate satisfactorily with end cap 16. The pads each has recesses 22 configured for coacting engagement with pin 20 as previously described.

As shown in FIG. 1 and indicated in FIG. 2, pads 13-15 are sequentially loaded into holder 12 with overlap 13b of pad 13 placed first into holder 12 such that, as shown in FIG. 6, pad undercut indentations 13d are slid along the holder protrusions 12a. Pad 13 is inserted along holder protrusions 12a until brought against the end of the cavity of holder 12. Brake pads 14 and 15 are then similarly loaded in close proximity within holder 12, overlapping ends fitting fully over under-lapping ends, as for instance under-lap end 13c mating with overlap end 14b. The pads 13-15 are thus closely mated by means of the overlap ends of a pad mating with the under-lap end of an adjacent pad. The end-to-end overlap and under-lap in the holder 12 and end cap 16 provide that protrusions and indentations thereof extend completely around the pads.

After the pads 13-15 are loaded they are captured securely in place by the attachment of complementary end cap 16, and insertion of locking pin 20. Thus the pad sequence and assembly braking characteristics may be changed by merely removing locking pin 20 and end cap 16, removing existing pads, and inserting pads of different braking compounds and/or rearranging the sequence of the pads. Any of the pads can be a specially designed pad, such as a wiper pad, configured to provide desired characteristics to the assembly. It is generally desirable that the rim-engaging surface of each pad be co-planar with that of the other pads so that the required effect of each pad is accomplished with substantially simultaneous engagement with the rim by each brake pad surface. However, this not a requirement as a pad could initially extend higher than other pads but of a compound designed to "mush" to another level so as to provide an additional characteristic such as wider breaking or cleaning area.

The rim direction of moving contact is directly into brake pad 15, thus pad 15 and end cap 16 directly bear the contact forces of the turning rim surface that tends to compress, displace, and pull out the pads from the brake assembly 10. This problem is eliminated by the combination of the features of the invention as shown and described. That is, the interaction of protrusions 12a, 16a of holder 12 and end cap 16 with the indentations 13d, 14d, 15d of the brake pads, the over lapping of the pads, and locking end cap 16, cooperate to stop the pads from being pulled out of the brake assembly 10.

Further, although not indicated in FIG. 6, a portion of the brake pad could be of a compound designed to provide brake pad break up and pull out resistance due to wheel rim moving forces whereas the remainder of the brake pad would manifest desirable braking characteristics. For instance, the brake pad portion indicated by numerals 15c, 15d and 15e could be of a compound designed to provide brake pad break up and/or pull out resistance whereas the exterior brake pad portion is formed of a compound that provides a desired breaking characteristic.

Figure 7:
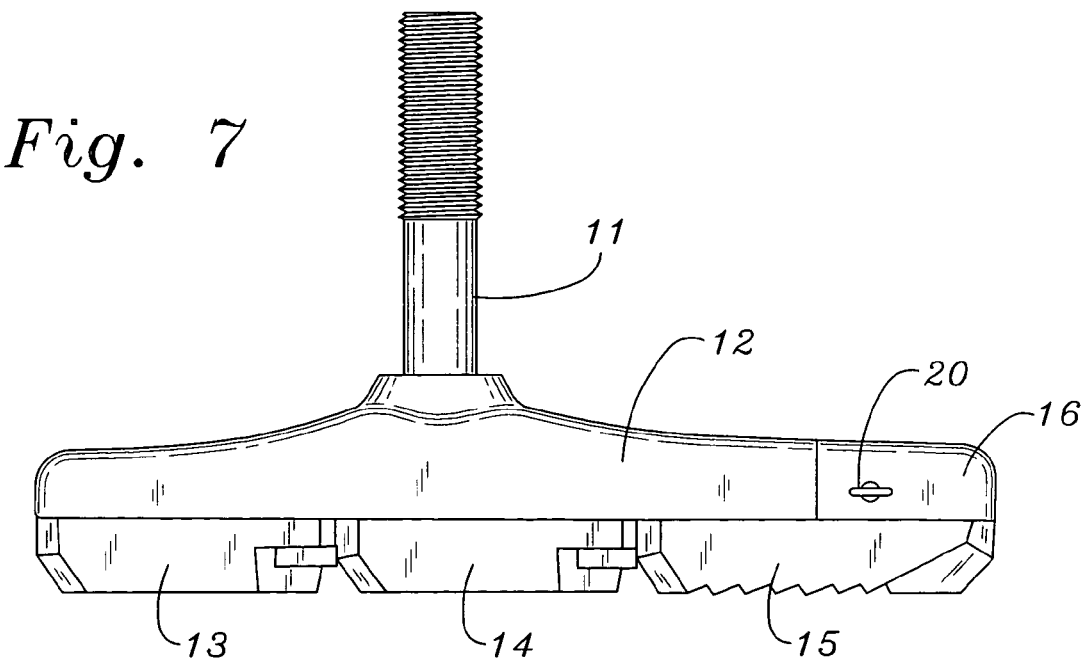
FIG. 7 is a side view of the brake shoe assembly of FIG. 1.
Figure 8:
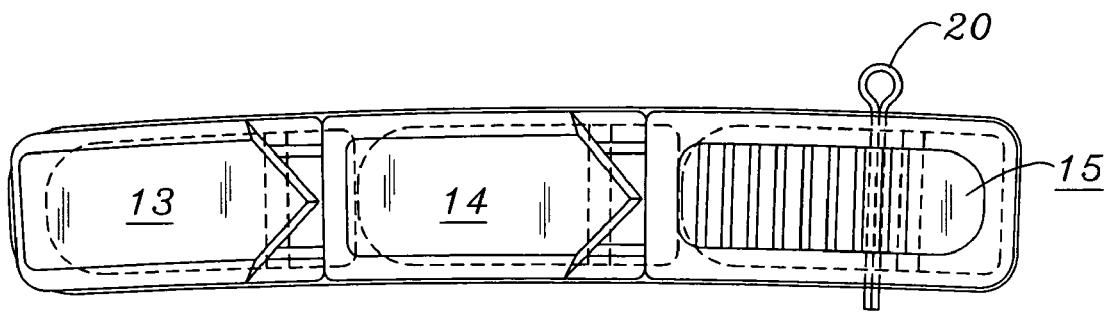
FIG. 8 is a bottom view of the brake shoe assembly of FIG. 6.
Figure 9:
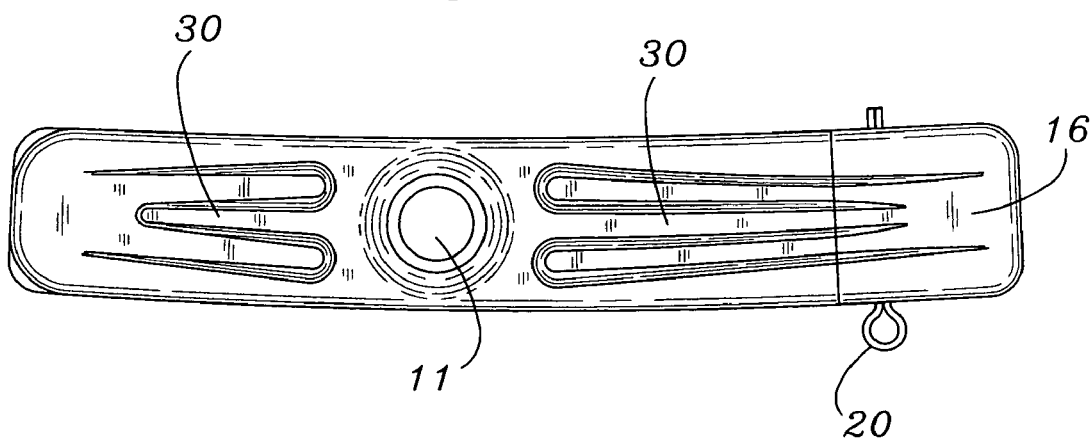
FIG. 9 is a top view of the brake shoe assembly of FIG. 6.

FIG. 6 is a perspective view, FIG. 7 is a side view, FIG. 8 is a bottom view and FIG. 9 is a top view of the brake pad in accordance with features of the invention. As indicated in FIGS. 7-9, for better contact of the brake pads with the bicycle wheel rim, holder 12 has a longitudinal curvature substantially in conformance with the radius of curvature of the bicycle wheel rim. The assembly configuration provides that the pads are in sequential alignment in the curved holder 12 and in alignment relative to the direction of travel of the rim of the bicycle. Also, as indicated in FIG. 5, the top of holder 12 has exposed molded functional structure ribs 30, in a corrugated manner that provides additional rigidity and strength to holder 12.

Brake shoe assembly 10 is shown with holder 12 having three brake pads therein, although more or fewer pads could be utilized by varying the lengths and/or configurations of the pads and/or changing the length of holder 12. In general, each pad is comprised of selected compounds that provide various desired braking characteristics and individually cured and formed such that they can be sequentially inserted into and removed from pad holder 12 as described. Further, even though the pads are generally individually molded of different compounds, it is to be understood that a pad can be unitarily molded to include two or more of the pads shown or can be formed of different compounds to enhance break up or pull out as described. Multi-rubber or elastomeric compounds having different combinations of multi-rubber or elastomers, not a particular combination, can be utilized to provide the desired braking characteristics. Additionally, the pads, or portions of the pads, may have different colors as a means of color-coding to distinguish certain characteristics of the pads. Also, different pad surface patterns can be used to identify certain braking characteristics. For instance, although not shown, brake pad surfaces 13a and 14a could have selected designs for identifying different characteristics. Additionally, although the means for complementary closing of the truncated pad holder is shown and described as an end cap with a locking pin, other complementary closure means such as a snap on end cap having interlocking means for mating with the holder can be employed within the spirit and scope of the invention.

In accordance with the above, there has been shown and described a bicycle brake pad assembly having replaceable pads with different braking characteristics providing for braking variation and flexibility under different riding conditions with adequate provision for pad stability in the pad holder. Individual brake pads have different braking characteristics are easily inserted into and removed from a truncated pad holder whereby the pads are easily replaced and rearranged within the holder. The pads have configuration and the holder has an end cap that provides for increased resistance to pad compression, bulging, and/or brake pad pull out of the holder due to wheel rim movement pressure on the pads.

The appended claims should not be limited to the description of the invention contained herein, it to be understood that various other adaptations and modifications may be made within the spirit and scope of the claims.

What is claimed is:

1. A brake pad assembly for a bicycle for urging a brake shoe against the rim of the bicycle, the combination comprising:

an elongate support member;

longitudinally extending brake pad holder affixed to said support member, said brake pad holder having multiple unitary brake pads in sequential abutting relationship with selected ones of said brake pads composed of different braking compounds for imparting a different braking characteristics to that brake pad;

said brake pad holder having a truncated end for slidably receiving said multiple brake pads in said brake pad holder;

said brake pad holder including inwardly projecting shoulder means to define a continuous recess for receiving said brake pads;

said brake pad holder and said brake pads configured for interchangeability of said brake pads within said brake pad holder;

closure means for complementary mating with said truncated end, said closure means including shoulder means and a recess complementary with the shoulder means and recess of said brake pad holder for receiving a portion of the last inserted brake pad to provide a continuous recess for securing said brake pads within the mated combination of said brake pad holder and said closure means; and wherein the mating of said closure means and said truncated end provides continuous circumferential compression restraint to resist pull out of said brake pads from said brake pad holder.

2. The brake pad assembly according to claim 1 wherein said closure means further includes a portion that slides over a mating reduced portion of said truncated end to mate respective shoulders and recesses of said closure means and said brake pad holder to provide said continuous recess, said closure means further including locking means providing for secure engagement with said truncated end.

3. The brake pad assembly according to claim 2 wherein said truncated end has inwardly reduced outsides with terminal ends of said shoulder means at said truncated end having step cuts, said closure means having cut outs in said complementary shoulder means whereby said closure means is slid over said reduced sides to mate said step cuts and said cut outs to thereby merge flush and even with said truncated end.

4. The brake pad assembly according to claim 3 wherein said brake pads include first and second portions separated by indentations in said brake pads, said first portion captively mounted in said brake pad holder by said shoulder means and said second portion extending from said brake pad holder and having a braking surface for contact with said bicycle wheel rim.

5. The brake pad assembly according to claim 4 wherein said first portion and said indentations include a compound for resisting brake pad pull out from said brake pad holder and said second portion includes a compound for imparting a selected braking characteristic.

6. The brake pad assembly according to claim 5 wherein said shoulder means of said truncated brake pad holder provides continuous extending capture means for interaction with said indentations in said brake pads to slidably receive said first portion of each said brake pad, said locking means including recess means in at least one of said brake pads and a locking pin, said shoulders, said recess, said closure means and said locking pin configured for mating coacting engagement to circumferentially lock said individual brake pads within said brake pad holder in circumferential compression retention.

7. A brake pad assembly for a bicycle for urging a brake shoe against the rim of the bicycle wheel, the combination comprising:
   a longitudinally extending brake pad shoe having a plurality of brake pads positioned in sequential abutting arrangement therein, said brake pads configured for interchangeability within said brake shoe with selected ones of said brake pads including a braking compound for imparting a different braking characteristic to said brake pad assembly;
   said brake pad shoe having a truncated open end and continuous recessed means for receiving said brake pads;
   closure means having recessed means complementary with said brake pad shoe recessed means for mating to said truncated end to provide a continuous recess around the mated combination of said brake shoe and said closure means to thereby secure said pads in abutting circumferential compression retention relationship within said brake shoe;
   said brake pads having an overlapping end and an under-lapping end with adjacent pads interlinking with said overlapping end over said under-lapping end;
   said overlapping end bearing down on said under-lapping end of an adjacent pad in response to wheel rim movement pressure to thereby provide restriction to prevent pull out of said pads from said brake shoe; and
   a locking device cooperatively interacting with said closure means and said truncated brake shoe end whereby said closure means is securely engaged with said truncated brake shoe.

8. The brake pad assembly according to claim 7, said locking device comprising:
   a recess in the last brake pad inserted into said truncated end; and
   a locking pin, cooperatively received by said closure mans, said truncated end and said recess whereby said closure means is secured to said truncated end thereby securing said brake pads within said brake pad shoe in a continuous circumferentially compressed retentive relationship.

9. The brake pad assembly according to claim 8 wherein said continuous recess, said closure means, the mating of the ends of said brake pads, and said locking device cooperate to prevent pull out of said brake pads from said brake shoe.

10. The brake pad assembly according to claim 7 wherein each of said plurality of brake pads is comprised of a top portion and a bottom portion, the portions defined by undercut indentations in said brake pads, and said brake shoe includes inwardly projecting shoulder means for mating with said indentations, said brake pads slidably received along said shoulder means with said bottom portion extending from said brake shoe and having a braking surface for contact with said bicycle wheel rim.

11. The brake pad assembly according to claim 10 wherein said top portion and the associated undercut indentation includes a compound to provide resistance to brake pad pull out due to wheel rim moving forces and said second pad portion includes a compound to provide a selected breaking characteristic.

12. A brake shoe assembly for a bicycle urging a brake shoe against the rim of the bicycle wheel, the assembly comprising:
   an elongate longitudinally extending brake shoe having a truncated end for receiving a plurality of brake pads in abutting arrangement sequentially positioned within said brake shoe, each brake pad having a rim engaging braking surface generally coplanar with the other and including pre-selected braking compounds for imparting a variety of braking characteristics to said brake pad assembly, said brake shoe and said brake pads configured for slidable interchangeability of said brake pads within said brake shoe;
   said brake pads having a top portion and a bottom portion defined by an indentation undercut from said top portion, said brake shoe including inwardly projecting shoulders configured for mating with said indentation whereby said brake pads are slidably received along said shoulders, said bottom portion extending from said brake pad holder and having a braking surface for contact with said bicycle wheel rim; and
   closure means for complementary mating with said truncated end to secure said pads within said brake shoe aligned to each other and to said brake shoe, said closure means having inwardly projecting shoulders complementary with the inwardly projecting shoulders of said brake shoe to provide a continuous recess around the combination of said brake shoe and said closure means for receiving and securing said brake pads in a continuous circumferentially compressed retentive relationship.

13. The brake pad assembly according to claim 12 wherein said brake pads have an overlapping end and an under-lapping end with adjacent pads interlocked with said overlapping end over said under-lapping end, and said overlapping end bears down on said under-lapping end of the adjacent pads to provide restriction to pull out of said pads from wheel rim movement pressure.

14. The brake pad assembly according to claim 12 further including locking means comprising a recess in the last inserted brake pad, said closure means and a locking pin, said recess, said truncated end and said closure means configured for interacting with said locking pin to fixedly position, capture and retain said brake pads within said brake shoe.

15. The brake pad assembly according to claim 12 wherein said truncated end is formed with the terminal outsides thereof recessed inwardly and with the terminal ends of said shoulders having step cuts, the shoulders of said closure means having cut outs whereby said closure means is slid along said recessed outsides and over said step cuts to mate flush and even with said truncated end.

16. A method for selectively changing braking characteristics of a brake pad assembly for a bicycle comprising:

providing a longitudinal extending brake shoe having inwardly projecting shoulders defining a recess in said holder and including a truncated end;

providing multiple brake pads with selected ones of said brake pads including different braking compounds for imparting a different braking characteristic to said brake pad assembly;

slidably inserting said brake pads in said brake pad shoe along said shoulders in sequential abutting relationship through said truncated end;

slidably interchanging said brake pads to provide different braking characteristics to said brake pad assembly; and providing closure means for complementary mating with said truncated end for securing said brake pads within said brake shoe assembly, said closure means and said brake shoe configured with complementary recesses and shoulders to provide a continuous recess completely around the mated combination of said brake shoe and said closure means for receiving and securing said brake pads in a continuous circumferentially compressed retentive relationship within said brake shoe assembly.

17. The method of claim 16 wherein said brake pads include a top portion configured for reception and capture in said recesses and includes a compound to provide resistance to brake pad pull out due to bicycle wheel rim moving forces and a bottom portion extending from said recesses that includes a compound to provide a braking surface for contact with said bicycle wheel rim.

* * * * *